United States Patent Office 2,753,360
Patented July 3, 1956

2,753,360

ESTERS OF 17α-HYDROXYPROGESTERONE

Emanuel Kaspar, Berlin-Wilmersdorf, Karl Heinz Pawlowski, Berlin-Hermsdorf, Karl Junkmann, Berlin, and Martin Schenck, Berlin-Frohnau, Germany, assignors to Firma Schering A. G., Berlin, Germany No Drawing. Application November 30, 1954,
Serial No. 472,226

Claims priority, application Germany December 12, 1953

10 Claims. (Cl. 260—397.4)

The present invention relates to 17α-oxyprogesterones and more particularly to certain new esters of 17α-oxyprogesterone which have a prolonged progestational activity and are in other ways superior to known progestational agents.

It is an object of the present invention to provide a new group of compounds which have improved progestional activity particularly with respect to the duration of activity.

It is another object of the present invention to provide methods of producing the new compounds of the present invention.

Other objects and advantages of the present invention will be apparent from a further reading of the specification and of the appended claims.

With the above objects in view, the present invention mainly comprises as a new composition of matter having high progestational activity, esters of 17α-oxy-progesterone and aliphatic carboxylic acids of 4 to 7 carbon atoms.

17-oxyprogesterone has been shown according to the data of Betenandt (in Naturwissenschaften, Volume 30, Page 4) in the Clauberg test with a dose of 5 mg. on rabbits to have no progestational activity.

It was therefore surprising to discover that many of its hitherto not described esters have a progestational effectiveness which not only to an extent considerably exceed the effectiveness of progesterone, but also have a considerably longer duration of activity.

The increased duration of the progestational activity of the compounds of the present invention may be observed in the following table. Infantile rabbits which were pretreated with estradiol were each given single injections of solutions of the substances listed in the table, each injection solution containing 10 mg. of the substance in sesame oil. The duration of the activity is compared in the following table to proesterone wherein the activity duration of 5½ days is taken as 0%.

| Substance | Duration | Corresponding to a percentage increase of duration of progestational activity of— |
|---|---|---|
| | Days | Percent |
| progesterone | 5½ | 0 |
| 17α-oxyprogesterone propionate | 5½ | 0 |
| 17α-oxyprogesterone butyrate | 8 | 45 |
| 17α-oxyprogesterone valerianate | 11½ | 110 |
| 17α-oxyprogesterone capronate | 11 | 100 |
| 17α-oxyprogesterone enanthate | 8½ | 55 |
| 17α-oxyprogesterone caprylate | 3 | 0 |

Photographs of uterus sections in each case made on the tenth day following the injection show that in the case of the valerianate and the capronate the secretion phase still fully persists while it has already completely disappeared in the case of progesterone.

These results permit the development of hormone preparations for human medication which with one single injection help to maintain the secretion phase of the uterus over a physiologically proper period of time.

It is important in view of the fact that relatively high concentrations of the new esters of the present invention will be used that the esters show good solubility, at least in certain solvents which are suitable for injection purposes. The particular esters of the present invention have this important property of good solubility in solvents for injection purposes.

The new and valuable 17α-oxyprogesterone esters of the present invention may be produced by esterifying 17α-oxyprogesterone with the chosen aliphatic carboxylic acid ester of 4 to 7 carbon atoms. Preferably the esterification of the 17α-oxyprogesterone is accomplished by means of the halogenide or the anhydride of the chosen acid. It is also possible according to the present invention to produce the products thereof by oxidation of the corresponding 17α-oxypregnene-(5)-ol-(3)-one-(20)-17-monoester whereby the hydroxyl group in 3-position is oxidized to the keto group. The oxidation may for example be carried out by means of aluminum alcoholate in the presence of a ketone.

The following examples are given to further illustrate the present invention, the scope of the invention not however being limited to the specific details of the examples.

Example 1

1 g. of 17α-oxyprogesterone is heated with 30 cc. of freshly distilled valeric acid anhydride for 15 hours at a temperature of 160–165° C. under an atmosphere of nitrogen. The excess anhydride is stirred with water and pyridine and the 17α-oxyprogesterone valerianate is extracted with ether. After washing the ether extract with dilute acid, sodium carbonate and water, the ether is evaporated under vacuum until dried and the raw 17α-oxyprogesterone-17-valerianate is recrystallized from isopropyl ether. The melting point is 137–139° C. The crystals are needle-like. $[\alpha]_D^{20} = +59°$ (c=1, in chloroform).

Example 2

1 g. of 17α-oxyprogesterone is reacted with 30 cc. of propionic acid anhydride in the presence of 1.056 g. of p-toluol sulfonic acid for 16 hours at room temperature under an atmosphere of nitrogen. The excess anhydride is then decomposed with water and pyridine and the ester extracted with ether. After washing the ether extract with dilute sulfuric acid, sodium carbonate and water, the ether is evaporated under vacuum until dried. The thus obtained raw 3-enol-17α-oxyprogesterone-3,17-dipropionate is dissolved in 40 cc. of methanol and in the presence of 1.4 cc. of concentrated sulfuric acid partially saponified by refluxing for 1 hour. The methanol is then evaporated under vacuum and the 17α-oxyprogesterone-17-propionate is recrystallized from isopropyl ether. Melting point: 160–162° C. (dense needle-like crystals) $[\alpha]_D^{20} = +61°$ (c=1, in chloroform).

Example 3

40 g. of 17α-oxypregnene-(5)-ol-(3)-one-(20)-acetate-(3) is brought to reaction with 22 g. of p-toluol sulfonic acid and 850 cc. of capronic acid anhydride under a nitrogen atmosphere for 5 days at room temperature or 2½ days at 37° C. The excess anhydride is blown off with steam in the presence of 200 cc. of pyridine and the distillation residue is extracted with ether and worked up as usual. The remaining oil is brought to crystallization with pentane and the raw 17α-oxypregnenolone-3-acetate-17-capronate is recrystallized from methanol. The crystals are needle-like and have a melting point of 104–105° C. This substance is partially saponified by refluxing for 1 hour in 1800 cc. of methanol in the presence of 13 cc. of concentrated hydrochloric acid. After evaporation of the methanol under vacuum, the dry residue is recrystallized from isopropyl ether or methanol (dense needles). The thus obtained 17α-oxypregnenolone-17-capronate melts at 145–146.5° C., $[\alpha]_D^{20} = -66°$, (c=1, in chloroform).

By oxidation in 100 cc. of absolute toluol with 425 cc. of cyclohexanone and 155 cc. of a 20% aluminum isopropylate solution in absolute toluol and after repeated crystallizations from isopropyl ether or methanol, 24 g. of pure 17α-oxyprogesterone-17-capronate is obtained. Melting point: 119–121° C., (dense needles), $[\alpha]_D^{20} = +61°$ (c=1, in chloroform).

The following are produced in analogous manner:

17α-oxyprogesterone butyrate—melting point: 123.5–124.5° C., $[\alpha]_D^{20} = +54°$ (c=1, in chloroform).
17α-oxyprogesterone enanthate—melting point: 113.5–115° C. $[\alpha]_D^{22} = +56°$ (c=1, in chloroform).
17α-oxyprogesterone caprylate—melting point: 75–75.5° C., $[\alpha]_D^{25} = +53.8°$ (c=1, in chloroform).

The solubility of the compounds of the present invention at room temperature as compared to progesterone and to 17α-oxyprogesterone-17-acetate (mg./cc.) is given in the following table:

| Substance | Sesame oil | Levulinic acid butyl ester |
|---|---|---|
| progesterone | 16–20 | 80–90 |
| 17α-oxyprogesterone-17-acetate | 0.5 | 5–8 |
| 17α-oxyprogesterone-17-propionate | 7–10 | 70–80 |
| 17α-oxyprogesterone-17-butyrate | 10–15 | 120–130 |
| 17α-oxyprogesterone-17-valerianate | 10–15 | 70–80 |
| 17α-oxyprogesterone-17-capronate | 25–29 | 350–400 |
| 17α-oxyprogesterone-17-enanthate | 10–15 | 95–100 |
| 17α-oxyprogesterone-17-caprylate | miscible | miscible |

*Example 4*

2.0 g. of 17α-oxyprogesterone are shaken in 50 cc. of enanthic acid anhydride with 2.3 g. of p-toluol sulfonic acid hydrate under nitrogen atmosphere and exclusion of light for 4 days at a temperature of 37° C. 60 cc. of methanol and 0.78 cc. of concentrated hydrochloric acid are then added and the mixture is heated under refluxing and in a nitrogen atmosphere until there is no color reaction with tetranitromethane on the enol (75 minutes). The reaction mixture is then cooled and 20 cc. of pyridine and 50 cc. of water are added and the reaction mixture is subjected to steam distillation in mild vacuum at 50–55° C. under nitrogen atmosphere. The steam distillation residue is shaken with methylene chloride, the methylene chloride solution is washed with 2n-hydrochloride acid, sodium bicarbonate and water, then dried and under vacuum evaporated in a nitrogen atmosphere. The immediately crystallizing residue is rubbed with pentane and after suctioning, the 2.2 g. of 17α-oxyprogesterone enanthate has a melting point of 95–104° C. After recrystallization from isopropyl ether, 1.8 g. remains with a melting point of 108–110° C. Further recrystallization raises the melting point to 113.5–115° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter having high progestational activity, a substance selected from the group consisting of 17α-oxyprogesterone butyrate, 17α-oxyprogesterone valerianate, 17α-oxyprogesterone capronate and 17α-oxyprogesterone enanthate.

2. As a new composition of matter having higher progestational activity, 17α-oxyprogesterone butyrate.

3. As a new composition of matter having high progestational acitvity, 17α-oxyprogesterone valerianate.

4. As a new composition of matter having high progestational activity, 17α-oxyprogesterone capronate.

5. As a new composition of matter having high progestational activity, 17α-oxyprogesterone enanthate.

6. In a process of producing the composition of claim 1, the step of esterifying 17α-oxyprogesterone with an aliphatic carboxylic acid selected from the group consisting of butyric acid, valeric acid, capronic acid and enanthic acid.

7. In a process of producing the composition of claim 1, the steps of reacting 17α-oxyprogesterone with the anhydride of an aliphatic carboxylic acid selected from the group consisting of butyric acid, valeric acid, capronic acid and enanthic acid so as to form the corresponding ester of 17α-oxyprogesterone; and recovering said ester.

8. In a process of producing the composition of claim 1, the steps of reacting 17α-oxyprogesterone with the halogenide of an aliphatic carboxylic acid selected from the group consisting of butyric acid, valeric acid, capronic acid and enanthic acid so as to form the corresponding ester of 17α-oxyprogesterone; and recovering said ester.

9. In a process of producing the composition of claim 1, the steps of oxidizing the 17-ester of 17α-oxypregnene-(5)-ol-(3)-one-(20) and an aliphatic carboxylic acid selected from the group consisting of butyric acid, valeric acid, capronic acid and enanthic acid until the hydroxyl group in 3-position is converted to the keto group; and recovering the thus formed 17α-oxyprogesterone ester.

10. In a process of producing the composition of claim 1, the steps of oxidizing the 17-ester of 17α-oxypregnene-(5)-ol-(3)-one-(20) and an aliphatic carboxylic acid selected from the group consisting of butyric acid, valeric acid, capronic acid and enanthic acid by means of aluminum alcoholate in the presence of a ketone until the hydroxyl group in 3-position is converted to the keto group; and recovering the thus formed 17α-oxyprogesterone ester.

References Cited in the file of this patent

FOREIGN PATENTS

| 228,644 | Switzerland | Dec. 1, 1943 |
| 536,621 | Great Britain | May 21, 1941 |